US006437561B1

(12) United States Patent
Bartingale et al.

(10) Patent No.: US 6,437,561 B1
(45) Date of Patent: Aug. 20, 2002

(54) SYSTEM FOR DETERMINING THE POSITION OF AN OBJECT WITH RESPECT TO A MAGNETIC FIELD SOURCES

(75) Inventors: Steven R. Bartingale, Stillwater; Mike E. Hamerly, Vadnais Heights; Jeff D. Haagenstad, Shoreview, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/441,475

(22) Filed: Nov. 17, 1999

(51) Int. Cl.[7] .............................. G01B 7/14; B62D 1/02; G08G 1/042; G01R 33/09
(52) U.S. Cl. ........................ 324/207.22; 324/207.12; 324/207.21; 324/326; 180/168; 340/941; 702/150
(58) Field of Search ................................. 180/167, 168, 180/169; 324/67, 326, 207.12–207.22; 340/901, 905, 941; 702/150

(56) References Cited

U.S. PATENT DOCUMENTS

| 3,575,255 A | | 4/1971 | Wickstrom ................... 180/98 |
| 3,668,624 A | | 6/1972 | Spaulding .................... 340/32 |
| 4,185,265 A | | 1/1980 | Griffin et al. ................ 340/32 |
| 4,906,988 A | | 3/1990 | Copella ....................... 340/825 |
| 5,189,612 A | * | 2/1993 | Lemercier et al. ...... 364/424.02 |
| 5,524,723 A | * | 6/1996 | Grambling et al. ......... 180/168 |
| 5,672,947 A | | 9/1997 | Hisada et al. ................ 318/587 |
| 5,853,846 A | * | 12/1998 | Clark et al. .................. 428/131 |

FOREIGN PATENT DOCUMENTS

| EP | 0 268 979 | | 6/1988 | ........... B60L/11/18 |
| EP | 0268979 | * | 6/1988 | ........... B60L/11/18 |
| FR | 2 610 427 | | 8/1988 | ............ G05D/1/02 |

* cited by examiner

Primary Examiner—Edward Lefkowitz
Assistant Examiner—Reena Aurora
(74) Attorney, Agent, or Firm—H. Sanders Gwin, Jr.; Peter L. Olson; Rudolph P. Hofmann, Jr.

(57) ABSTRACT

A detection system determines the position of an object moving along a first direction. The system includes a magnetic field source generating a magnetic field signal and a magnetic field detection system coupled to the object. The detection system includes a source interface module with magnetic field sensors positioned a known distance apart along a second direction different from the first direction. Each sensor detects the magnetic field generated by the magnetic field source and generates a magnetic field signal. A processing module processes the magnetic field intensity signal produced by the source interface module. The processing module generates data for each sensor in the source interface module, which is made up of points representing peak magnetic field and sensor location along the second direction. The points are compared to determine the distance of the object from the magnetic field source along the second direction.

26 Claims, 13 Drawing Sheets

SYSTEM FOR DETERMINING THE POSITION OF AN OBJECT WITH RESPECT TO A MAGNETIC FIELD SOURCES

BACKGROUND OF THE INVENTION

1. Field of the Invention

The present invention is a detection system that may be used to continuously determine the position of an object with respect to a magnetic field source. More particularly, this detection system determines the distance of the object from the magnetic field source by extrapolating and comparing magnetic field data generated by multiple magnetic field sensors spaced at known distances from one another.

2. Description of Related Art

Numerous systems have been proposed for coupling a magnetically coded signal to an object to be guided, such as a vehicle traversing a roadway. These systems rely on an array of magnetic fields generated by permanent magnets embedded in or placed atop the roadway. A transducer on the object to be guided derives an electric signal in response to the magnetic field signal from the roadway. Most of these systems include transducers responsive to the magnitude or polarity of the magnetic field. However, since the magnitude of the magnetic field is constantly varying as a result of noise and changing environmental conditions, few of these guidance systems have been able to reliably guide an object along a roadway.

In some of these systems, a single magnetic sensor on the object to be guided measures all components of the guiding magnetic field at a single location, and then utilizes these data to guide the vehicle. This approach requires complex processing hardware and is quite expensive. In addition, if the height of the magnetic sensor varies with respect to the magnetic field source, if the location of the magnetic sensor on the object changes, or if the output of the magnetic field source varies for any reason, the distance information generated by the system becomes unreliable. These systems are also greatly affected by noise, such as the magnetic signals produced by metallic objects. Some systems have attempted to solve these problems by storing and accessing previously measured height and magnetization information. However, if conditions change, the assumptions under which these height and magnetization data were generated are no longer applicable, and system performance degrades.

Other systems compare the electrical signals produced by two transducers and feed these data back to a guidance system to maintain the position of the object centered directly over the magnetic field source. These systems are useful for objects that travel slowly under controlled conditions, but if the object crosses over the magnetic field source and is not centered over the source, system performance degrades.

SUMMARY OF THE INVENTION

This invention provides a simple and inexpensive system for determining the position of an object relative to a magnetic field source. This system determines the position of an object independent of magnetic field source magnetization information and independent of the height of the magnetic field sensors relative to the magnetic field source.

In one embodiment, the present invention is a detection system for determining the position of an object as the object moves along a first direction. The system of the invention includes a magnetic field source generating a magnetic. field signal and a magnetic field detection system coupled to the object. The detection system includes a source interface module with magnetic field sensors positioned a known distance apart along a second direction different from the first direction. Each sensor detects the magnetic field generated by the magnetic field source and generates a magnetic field signal corresponding to the relative intensity of the magnetic field detected by the sensor. A processing module processes the magnetic field signals produced by the source interface module. Using the magnetic field signals, the processing module first determines a magnetic field peak along the first direction for each sensor. The processing module then compares the magnetic field peak data to determine the distance of the object from the magnetic field source along the second direction.

In a second embodiment, the present invention is a detection system for determining the position of a vehicle as the vehicle travels in a first direction. The detection system determines the position of the vehicle along a second direction substantially normal to the first direction. A magnetic tape mounted on the surface along the first direction is used as a magnetic field source. The tape generates an oscillating magnetic field signal in the first direction and in a second direction substantially normal to the first direction. The magnetic field detection system is coupled to the vehicle, and includes a source interface module with a centrally located magnetic field sensor, at least one first magnetic field sensor located on a first side of the central sensor, and at least one second magnetic field sensor located on a second side of the central sensor opposite the first side. The magnetic field sensors are aligned with one another and positioned a known distance apart along the second direction. Each sensor detects the magnetic field generated by the tape in the first direction and generates a magnetic field signal corresponding to the relative intensity of the magnetic field detected by the sensor. A processing module processes the magnetic field signals produced by the source interface module. The processing module first determines from the magnetic field signals a magnetic field peak in the first direction for each sensor. The processing module then uses the magnetic field peaks to calculate a first slope of a first line between a data point for the centrally located magnetic field sensor and a data point for at least one first magnetic field sensor located on the first side of the centrally located magnetic field sensor. The processing module then calculates a second slope of a second line between the data point for the centrally located magnetic field sensor and a data point for at least one peripheral magnetic field sensor on the second side. Then the processing module evaluates the first slope, the second slope and the peak data to determine the distance of the object from the tape along the second direction.

In a third embodiment, the present invention is a position detection module that may be detachably mounted on a vehicle moving in a first direction. The module is typically encased within an elongate enclosure. Within the enclosure are at least two magnetic field sensors. The sensors are aligned with one another along a second direction substantially normal to the first direction. Each sensor detects the magnetic field generated by the tape in the first direction and generates a magnetic field signal corresponding to the relative intensity of the magnetic field detected by the sensor. A processing module processes the magnetic field signals produced by the magnetic field sensors to determine a magnetic field peak in the first direction for each sensor. The processing module then evaluates the magnetic field peaks using a known calibrated slope to determine the distance of the object from the tape along the second direction.

In a fourth embodiment, the present invention is a method for determining the position of an object that is moving in a first direction. The method includes the initial step of generating a magnetic field signal in the first direction. This magnetic field signal is then sensed with an array of magnetic field sensors positioned a known distance apart along a second direction different from the first direction. Each sensor in the array detects the magnetic field signal along the first direction and generates a magnetic field signal corresponding to the relative intensity of the detected field. The magnetic field signals are used to determine a magnetic field peak in the first direction for each sensor. The magnetic field peaks from the sensors in the array are used to calculate a first slope of a first line between a first data point for a first sensor and a second data point for a second sensor. The peaks are next used to calculate a second slope of a second line between the first data point for the first sensor and a third data point for at least one third sensor. The processing module then evaluates the first slope, the second slope, and the peak data using the calibrated slope to determine the distance of the object from the tape along the second direction.

In a fifth embodiment, the present invention is a computer readable article of manufacture containing program code that, when executed by a processor, causes a digital computer to perform a series of operations. The computer receives input signals representative of magnetic field signals generated by each sensor in an array of magnetic field sensors mounted on an object moving in a first direction. The magnetic field sensors in the array are positioned a known distance apart along a second direction different from the first direction. Each sensor in the array detects the magnetic field signal along the first direction and generates a magnetic field signal corresponding to the intensity of the detected field. The computer reads the magnetic field signals from the sensors and determines a magnetic field peak in the first direction for each sensor. The magnetic field peaks are used to calculate a first slope of a first line between a first data point for a first sensor and a second data point for a second sensor. The peaks are next used to calculate a second slope of a second line between the first data point for the first sensor and a third data point for at least one third sensor. Then the processing module evaluates the first slope, the second slope and the peak data using the calibrated slope to determine the distance of the object from the tape along the second direction.

In a sixth embodiment, the present invention is a computer readable medium encoded with a computer program arranged such that, when executed, causes the computer to receive input signals representative of a magnetic field signals generated by an array of magnetic field sensors. The sensor array is mounted on an object, such as a vehicle or robot, moving in a first direction. The magnetic field sensors in the array are aligned with one another and positioned a known distance apart along a second direction generally normal to the first direction. Each sensor detects a magnetic field along the first direction and generates a magnetic field signal corresponding to that location. The computer determines the magnetic field peaks for each sensor in the array. The computer then calculates a first slope of a first line between a data point for a first magnetic field sensor and a data point for a second magnetic field sensor, and calculates a second slope of a second line between the data point for the first magnetic field sensor and a data point for a third magnetic field sensor. The first slope and the second slope are evaluated to determine the location of the sensors in the array with respect to the magnetic field source.

If the slope data indicates that the sensors are positioned over the magnetic field source, an appropriate distance calculation algorithm is used to determine the distance of the object from the magnetic field source along the second direction.

If the slope data indicates that the sensors are not positioned over the magnetic field source, an appropriate distance calculation algorithm based on a lookup table stored in memory is used to determine the distance of the object from the magnetic field source along the second direction. Using the magnetic peak values determined in the first direction, the computer retrieves a pair of peak difference values and their corresponding calculated distance values from the lookup table stored in memory. An interpolation procedure between the pairs of peak difference values in the lookup table is used to determine, based on the position of the sensors in the array along the second direction, the distance of the object from the magnetic field source along the second direction.

The present invention is a simple detection system for determining the position of an object with respect to a magnetic signal. As environmental conditions change, the system may encounter noise, the magnetization of the magnetic field source in a particular area may change, or the distance of the magnetic field sensors from the magnetic field source may vary. The detection system of the present invention calculates distance by comparing magnetic field data from multiple sensors positioned at known locations. This comparison step removes common mode noise (noise seen by all sensors), such as that seen from railroad tracks and other metallic objects, since this noise is subtracted out in the distance calculation. Thus, the detection system of the present invention provides accurate distance information in noisy environment. In addition, the measurement of magnetic field intensity data from multiple sensors makes the distance calculation independent of the height of the sensors above the magnetic field source. The system designer thus has great flexibility in selecting a location for the sensors on the object to be tracked. Once this position is selected, if the height of the object above the magnetic field source is changed for any reason, the distance calculation remains accurate.

In the system of the present invention the distance of the object from the magnetic field source may be determined by detecting only a single component of the magnetic field generated by the source. Additional sensors are not required, which reduces the impact of noise and lowers costs compared to conventional detection systems.

The details of one or more embodiments of the invention are set forth in the accompanying drawings and the description below. Other features, objects, and advantages of the invention will be apparent from the description and drawings, and from the claims.

DESCRIPTION OF THE PREFERRED EMBODIMENTS

Figure 1:
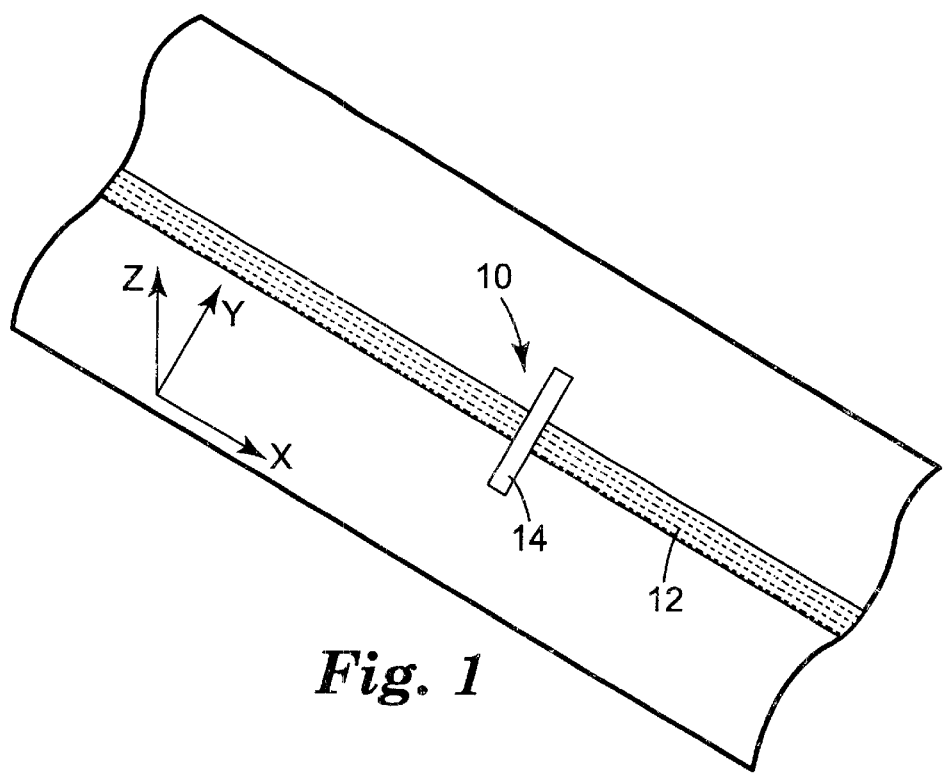
FIG. 1 is a schematic representation of an embodiment of the detection system of the present invention.

An embodiment of a detection system 10 of the present invention is shown in FIG. 1. The detection system consists of two major components, a magnetic field source 12 and a magnetic field detection system 14. For clarity, in this embodiment the magnetic field source 12 is depicted in FIG. 1 as positioned generally along the x-axis of a Cartesian coordinate system, although the orientation of the source 12 may be varied depending on the intended application. In this embodiment the x-direction is also assumed to be the direction of travel for an object to be tracked by the detection system 10, although such an orientation is not required. The magnetic field source 12 produces a magnetic field signal in all directions, which may be resolved into components $H_x$, $H_y$, $H_z$. In this embodiment the magnetic field detection system 14 is positioned generally normal to the direction of travel of the object to be tracked (along the y-axis in FIG. 1), although such an orientation is not required. The detection system 14 may measure only one component of the magnetic field produced by the magnetic field source 12, $H_x$ in this embodiment, but other components may be measured as required in a particular application. The magnetic field detection system 14 then processes the sampled magnetic field data to provide continuous information about the location of the object along the y-axis with respect to the source 12.

Figure 2:
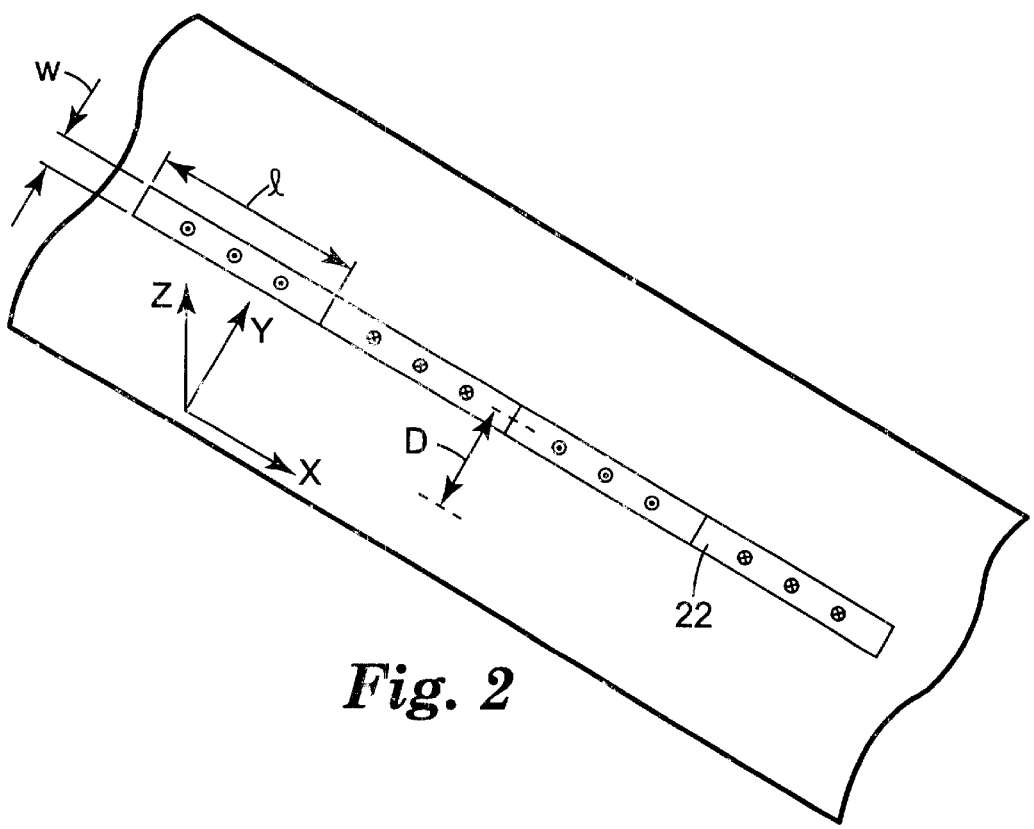
FIG. 2 is a schematic representation of an embodiment of a magnetic field source for use in the present invention.

Any method of generating a magnetic field may be used, but the source 12 should be selected that generates a strong, sustained magnetic field at a low cost. The source 12 should also be resistant to environmental damage and convenient to apply as a continuous unit to a substrate, for example, a roadway or a selected area of a factory floor. As illustrated in FIG. 2, the magnetic field source 12 that is in this embodiment of the present invention for application to a roadway 20 is a magnetic "tape" 22. An example of a tape 22 that may be used in the invention is described in U.S. Pat. No. 5,853,846, incorporated herein by reference. The tape in the '846 patent includes an elongate continuous carrier backing on which ferromagnetic particles are applied in a discrete pattern.

The tape 22 may be affixed to a surface of the roadway 20 using an adhesive, embedded in a trench cut into the roadway, or placed under the surface of the roadway. The location of the tape 22 on the roadway is unimportant as long as the magnetic field produced by the tape is sufficiently intense to be sampled and read effectively by the detection system 14. The tape 22 may be arranged along the roadway in contiguous abutting sections such that the polarity of the magnetic field produced in a particular section of the tape 22 is preferably opposite the polarity of the magnetic field produced in an adjacent section. This arrangement is not required, and a continuous tape with areas of varying polarity, or with a uniform polarity, may be used. If sections of tape are used, the sections need not abut one another, and need not have alternating polarity. However, a magnetic field source with reversing polarity produces a maximum magnetic field signal $H_x$ at the transition from one section to another and reduces the impact of noise on the detection system. The adjacent tape sections could be magnetized with a single polarity, but signal detection in noisy environments would become more difficult. The length l and width w (See FIG. 2) of a section of the tape 22 that 20) generates a magnetic field with a particular polarity may vary widely depending on the intended application. Longer tape sections produce a stronger magnetic field, but the response time of the distance detection system correspondingly decreases.

Figure 3:
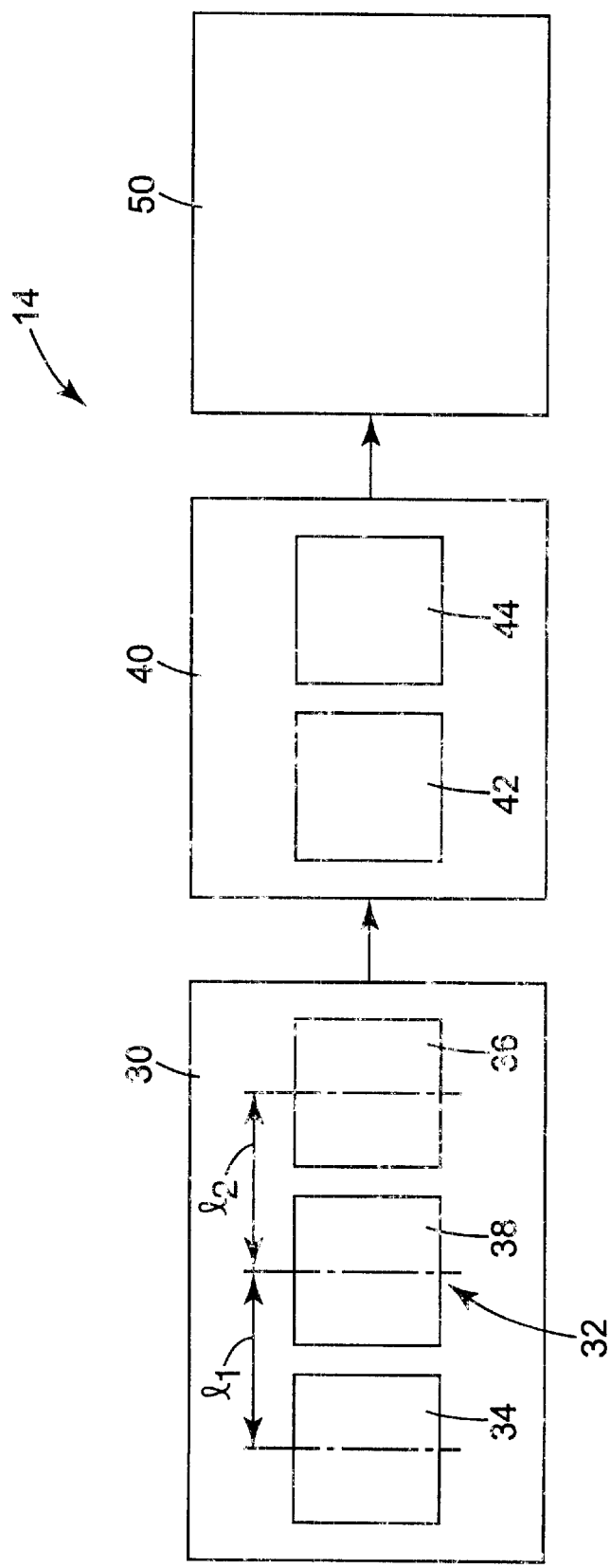
FIG. 3 is a schematic representation of the components of a processing module for use in an embodiment of the present invention.

Referring to the schematic block diagram in FIG. 3, this embodiment of the magnetic field detection system 14 typically includes three major components: a magnetic field source interface module 30, a sensor interface module 40, and a processing module 50. The source interface module 30 includes at least two magnetic field sensors 32. The magnetic field sensors 32 may be arranged in a wide variety of configurations depending on the intended application. For example, the spacing between the sensors, or number of sensors, could be varied to extend the sensing range or improve accuracy. In the embodiment shown in FIG. 3, an array of magnetic field sensors 32 includes three sensors. A pair of peripheral magnetic field sensors 34, 36 are mounted a known distance $l_1, l_2$ on each side of a central magnetic field sensor 38. Preferably, the peripheral sensors 34, 36 are mounted on a line containing the central sensor 38, although such an arrangement is not required.

Any suitable magnetic field sensor may be used in the present invention, such as, for example, giant magnetoresistive field (GMR) sensors. The distances $l_1, l_2$ between the central magnetic sensor 38 and the peripheral magnetic sensors 34, 36 may vary widely depending on the system resolution desired, the size of the magnetic field source, and the size of the roadway. The distances $l_1, l_2$ may be the same or different, and $l_1, l_2$ are normally on the order of about 10 inches (25 cm).

The sensor system may be designed to sample any individual component ($H_x, H_y, H_z$) of the magnetic field produced by the tape 22, or any combination thereof. In this embodiment the magnetic field sensors 34–38 sample the x-component of the magnetic field produced by the tape 22 ($H_x$) along the direction of travel of the object to be tracked (See FIGS. 1–2). Additional sensors that monitor the y-component of the magnetic field ($H_y$) may be used to provide a redundant means for determining the location of the side of the tape 22 (y-direction) relative to the magnetic field sensors and would also aid in sampling $H_x$ peak values.

The magnetic field may be sampled in many different ways known to those skilled in the art. For example, magnetic field samples may be taken at discrete times. While the discrete sampling method is simple and effective, it is also easily affected by noise at particular points on the $H_x$ or $H_y$ signal. A more noise-resistant system generates field data by sampling energy through discrete Fourier transforms over one or more $H_x$ cycles. In the present embodiment, the magnetic sensors 34–38 sample the peak of the x-component of the magnetic field ($H_x$). Since $H_x$ and $H_y$ are out of phase by 90°, when $H_y$ transitions through zero, $H_x$ is at its maximum. Therefore, $H_x$ may conveniently be sampled at the time $H_y$ transitions through zero, although peak data may be sampled at any time appropriate in a particular application. The sensor interface module 40 filters, samples, and converts the signals from the magnetic sensors 34, 36, 38 into digital data. The sensor interface module 40 includes electronic components to condition and amplify low-level signals from each magnetic sensor 34, 36, 38 in the array. In the present embodiment the sensor interface module includes analog circuitry 42 for filtering and an A/D converter 44 that digitizes the sensor signals at a desired rate. The digitization rate performed by the A/D converter 44 may also vary widely depending on the intended application. One of ordinary skill in the art may select an appropriate digitization rate for a particular application.

The detection system 14 is typically in the form of a bar, encased and/or potted in a weather-resistant enclosure. The sensor system 14 may be mounted anywhere on the object to be tracked, as long as the system 14 is sufficiently close to the tape 22 to allow magnetic field sensors 34–38 to sample the magnetic field produced by the tape 22. As explained in more detail below, the distance of the magnetic field sensors 34–38 above the tape 22 (referred to herein as the "HEIGHT," and measured along the z-axis in FIG. 1) is not critical to the operation of the present invention. However, the height data provides additional location information that may be used to further clarify the position of the detection system 14 with respect to the magnetic field source.

The final component in the detection system 14 is the processing module 50. The processing module 50 contains a digital processor that performs the data acquisition, signal processing, and user interface functions for the detection system 14. Many known digital computer processors would be suitable for use as the processing module 50, including an interfaced personal computer or a micro controller based system.

Figure 4A:
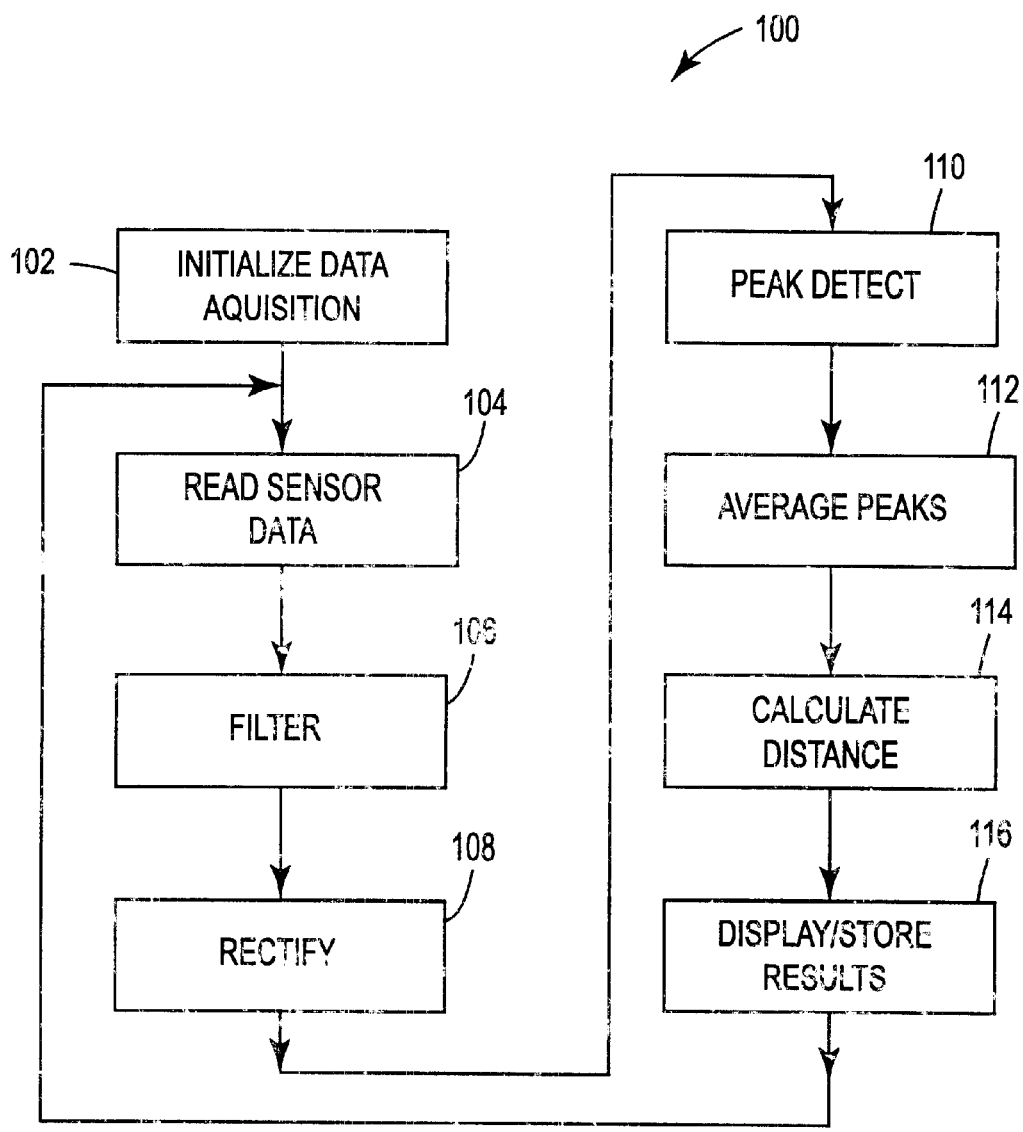
FIG. 4A is a flow diagram depicting an embodiment of a data acquisition procedure performed by a microprocessor in the processing module of the present invention.

In FIG. 4A, an embodiment of a data acquisition procedure performed by a microprocessor in the processing module 50 is broadly depicted by the flow chart 100. In block 102 the A/D converter 44 in the sensor interface module 40 (See FIG. 3) is initialized for continuous acquisition at a desired sampling rate. In block 104 a unit (multiple samples) of sensor data is read from the A/D converter 44 for each of the magnetic field sensors in the source interface module 30, in this embodiment sensors 34, 36, 38. Next, in block 106, the signals read from the sensors 34, 36, 38 are filtered to remove any DC components and/or low or high frequency noise. Any appropriate filter for this purpose may be selected by one of ordinary skill in the art. In block 108 the filtered sensor signals are rectified to allow the processor to more easily detect peaks on tape segments with varying or reversing polarity.

Figure 4B:
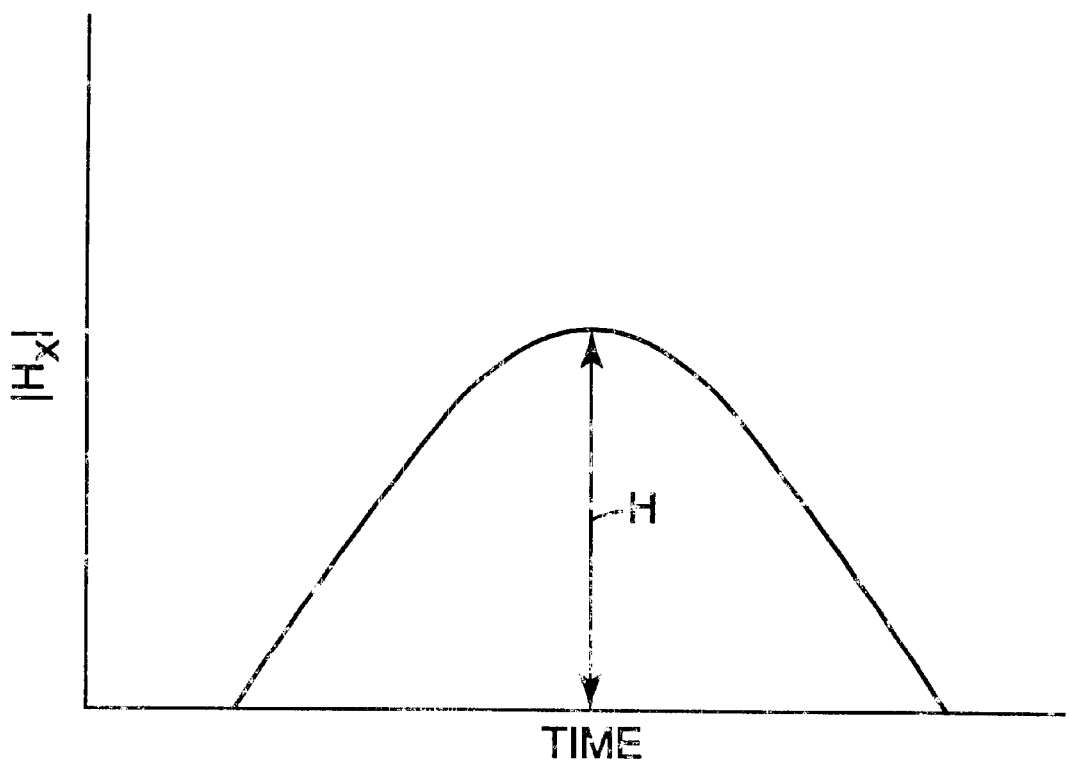
FIG. 4B is a plot illustrating the peak detection procedure performed by the processing module of the present invention.

Peak detection is then performed in block 110 on the rectified signals. As shown in FIG. 4B, in this embodiment peak detection means measurement of the height H of a curve representing the x-component of the magnetic field intensity ($H_x$). In block 112, a moving average is calculated for the peak values from each sensor. In block 114, the microprocessor performs a distance calculation algorithm on these average peak values, and the results may be stored in memory in block 116.

Following the data acquisition step, the processing module 50 performs a distance calculation algorithm to calculate the distance D of the object from the centerline of the magnetic field source (tape 22 in this embodiment) based on the average peak data received from the magnetic sensors 34–38 (See FIGS. 2–3). The flow diagram in FIG. 5A broadly illustrates the steps performed by the microprocessor in calculating the distance D.

First, as noted above, in data acquisition step of the present embodiment, average peak data for each of the sensors 34, 36, 38, is generated. These peak data represent the average values of the x-component of the magnetic field ($H_x$) for each sensor. As shown in FIG. 3, the peripheral sensor 34 is positioned a known distance $l_1$ from the central sensor 38, and the peripheral sensor 36 is positioned a known distance $l_2$ from the central sensor 38. If the average peak value for each sensor is plotted against the distance of that sensor from the central sensor, it is possible to define three points with two coordinates, sensor position and average sensor peak, each, designated herein as ($POS_n$, $PEAK_n$). A logarithm (referred to herein as LOG) of the average peak value is preferably used to linearize the sensor peaks over distance. A logarithm function of any base (e.g. base 2 LOG or base 10 LOG) may be used depending on the intended application, since only a scaling factor would change.

Figure 5A:
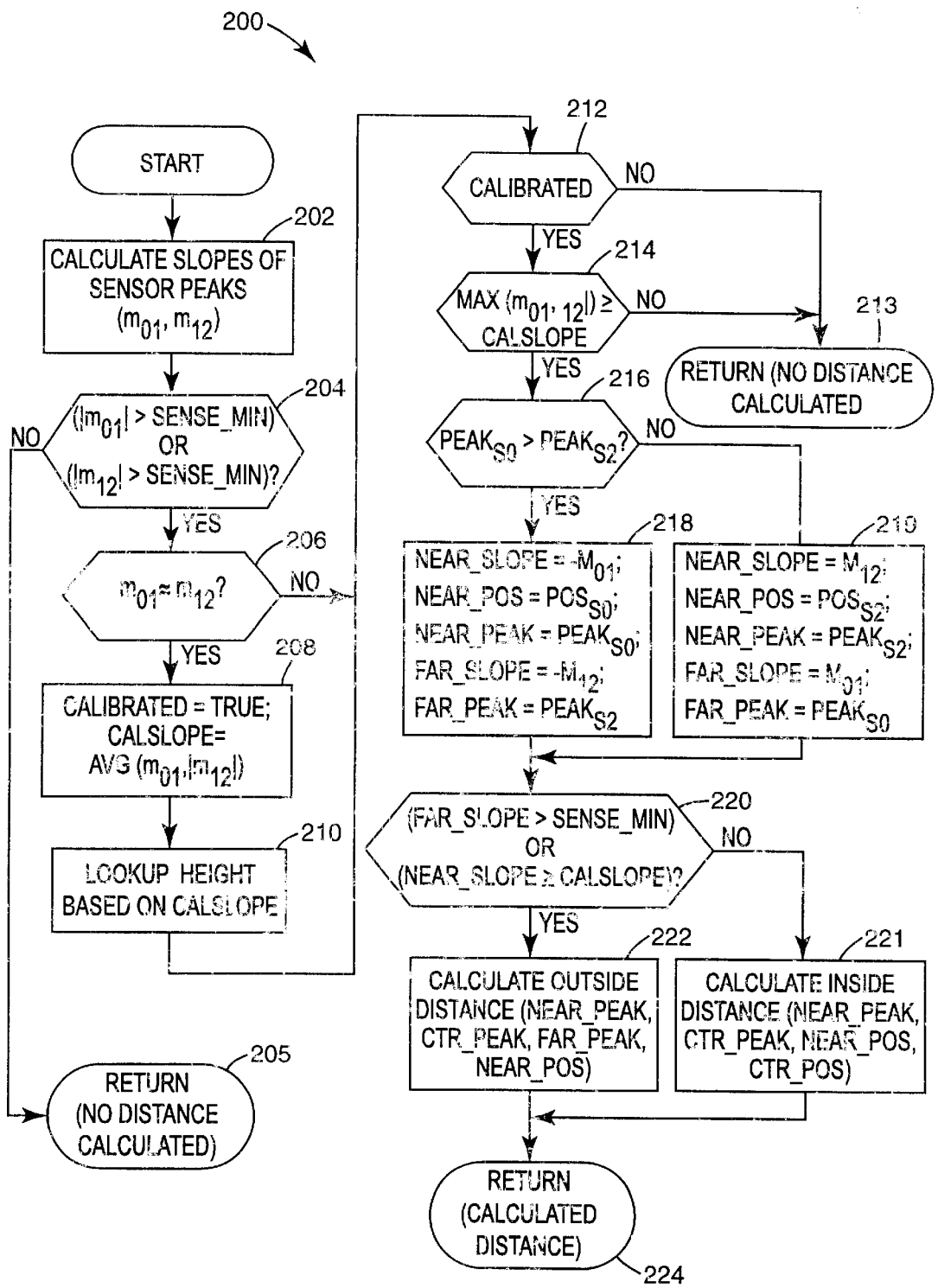
FIG. 5A is a flow diagram illustrating a distance calculation algorithm performed by the processing module of the present invention.
Figure 5B:
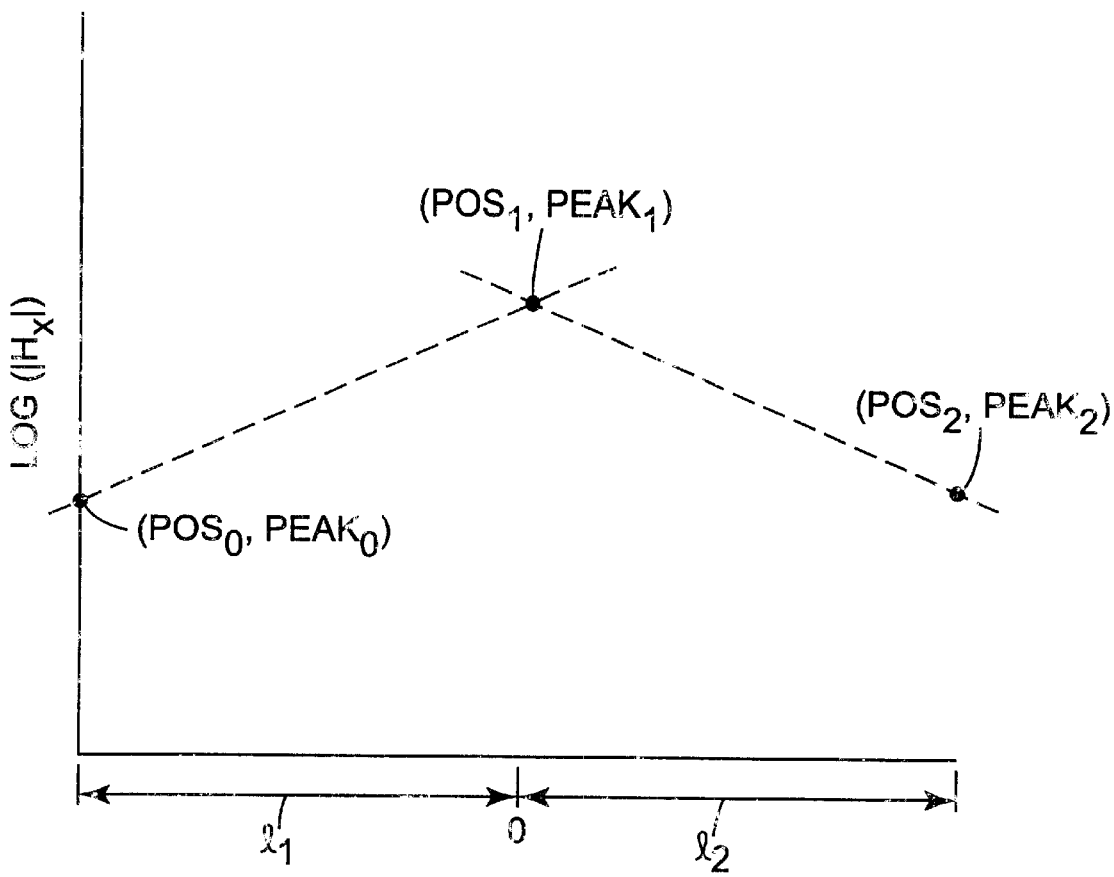
FIG. 5B is a two-dimensional plot of the data points utilized by the microprocessor in the inside distance algorithm.

If, for example, the peripheral sensor 34 is designated by the processor as sensor 0, the central sensor 38 is designated as sensor 1, and the peripheral sensor 36 is designated as sensor 2, the corresponding points for the sensor arrangement data set in the present embodiment are shown in FIG. 5B.

In the first step of the distance calculation procedure 200 shown in FIG. 5A, at block 202 the slopes of the lines connecting the points ($POS_0$,$PEAK_0$), ($POS_1$, $PEAK_1$) and ($POS_2$,$PEAK_2$) may then be calculated using the following formula:

$$m_{01} = \frac{\text{LOG}(PEAK_{S0}) - (\text{LOG}(PEAK_{S1})}{POS_{S0} - POS_{S1}}$$

$$m_{12} = \frac{\text{LOG}(PEAK_{S1}) - \text{LOG}(PEAK_{S2})}{POS_{S1} - POS_{S2}}$$

In block 204, a check is made to see if either of the calculated slopes $m_{01}$ and $m_{02}$ satisfy a set of pre-calculated minimum tape sensing criteria stored in memory. These tape-sensing criteria are based on known system parameters. If the tape sensing criteria are not met, the microprocessor exits the algorithm at block 205 and no distance value is returned.

As shown in block 206 of FIG. 5A, if the tape sensing criteria are satisfied, the slopes $m_{01}$ and $m_{02}$ are evaluated. If the slopes $m_{01}$ and $m_{02}$ are opposite and roughly equal in magnitude, it is known that the magnetic field source is under the center sensor 38. This point may optionally be utilized by the system to determine a calibrated slope. The calibrated slope is an indication of the change in the magnetic field with respect to a distance change along the second direction. As shown in block 208, a calibration value referred to herein as CALSLOPE is then calculated as the average of the slopes $m_{01}$ and $m_{02}$, and the system is calibrated using this value. The CALSLOPE value is stored in memory, and whenever the average of the computed slopes is equal to CALSLOPE, it is known that the center sensor 38 is directly over the magnetic field source. Of course, if CALSLOPE is known, it may be stored in memory directly prior to operation of the system to be used on startup, and the calibration steps may be eliminated. If CALSLOPE is determined in advance and stored in memory, the detection system only requires the input of two magnetic field sensors, in this embodiment a center sensor 38 and one peripheral magnetic field sensor. If the slopes $m_{01}$ and $m_{02}$ are not opposite and roughly equal in magnitude, and no CALSLOPE is stored in memory, the system checks in block 212 to determine if a calibration step has been performed. If not, the microprocessor exits the algorithm at block 213 and no distance value is returned.

As shown in block 210, based on the calculated or stored value of CALSLOPE, it is also possible to determine the height of the source interface module 30 above the magnetic field source (measured along the z-axis in FIG. 1). This value is referred to herein as HEIGHT. The HEIGHT is determined when the microprocessor retrieves an appropriate value from a lookup table stored in memory. The lookup table is created using an appropriate simulation model or actual test data. The lookup table includes pre-calculated HEIGHT vs. x-component of magnetic field intensity (Hx)

values. As explained in more detail below, the HEIGHT may be used later in the distance calculation procedure.

As illustrated in block 212, if the system has never been calibrated, and no CALSLOPE value is stored in memory, no distance value may be generated. If the system has been calibrated and CALSLOPE thereafter stored in memory, or, if a CALSLOPE value is stored in memory on startup, a check is made in block 214 to determine whether the magnitude of either slope $m_{o1}$ or $m_{o2}$ is at least equal to the CALSLOPE value. If neither slope meets the criteria, the microprocessor exits the algorithm at block 213 and no distance value is generated.

If the magnitude of either of the slopes $m_{o1}$ or $m_{o2}$ is greater than or equal to CALSLOPE, in block 216 the $H_x$ peak values of the peripheral sensors are examined. In blocks 218 and 219, the sensor with the largest peak value is determined to be closest to the magnetic field source, and variables in the system are initialized accordingly. The next check in block 220 determines which of two possible distance calculation methods the microprocessor will use— the "inside distance algorithm" (FIG. 6) in block 221 or the "outside distance algorithm" (FIG. 7A) in block 222. In block 220, if: (a) the magnitude of the slope of the line containing the peak $H_x$ value of the sensor farthest from the tape (referred to herein as the FARSLOPE) does not meet the tape sensing criteria stored in memory; or, (b) the magnitude of the slope of the line containing the peak Hx value of the sensor closest to the tape (referred to herein as the NEARSLOPE) is at least equal to the CALSLOPE, the magnetic field source lies outside the span of the source interface module (measured along the y-axis in FIG. 1) and the outside distance algorithm of FIG. 7A and block 222 is used to determined the distance value in block 224. Otherwise, the magnetic field source lies within the span of the source interface module (measured along the y-axis in FIG. 1) and the inside distance algorithm of FIG. 6 and block 221 is used to determined the distance value in block 224.

A variation on the above procedure is to ignore the calibration step and use the steepest (largest magnitude) of the slope $m_{o1}$ or $m_{o2}$ found each time as an approximation for the CALSLOPE. Although the steepest slope varies somewhat over distance, depending on the intended application it may be a sufficiently accurate approximation. Determining whether the magnetic field source lies inside or outside the span of the tape interface module may be difficult if the true CALSLOPE is not known. However, an additional sensor or sensors sensing the y-component of the magnetic field intensity ($H_y$) could be used to provide additional data if necessary.

Figure 6:
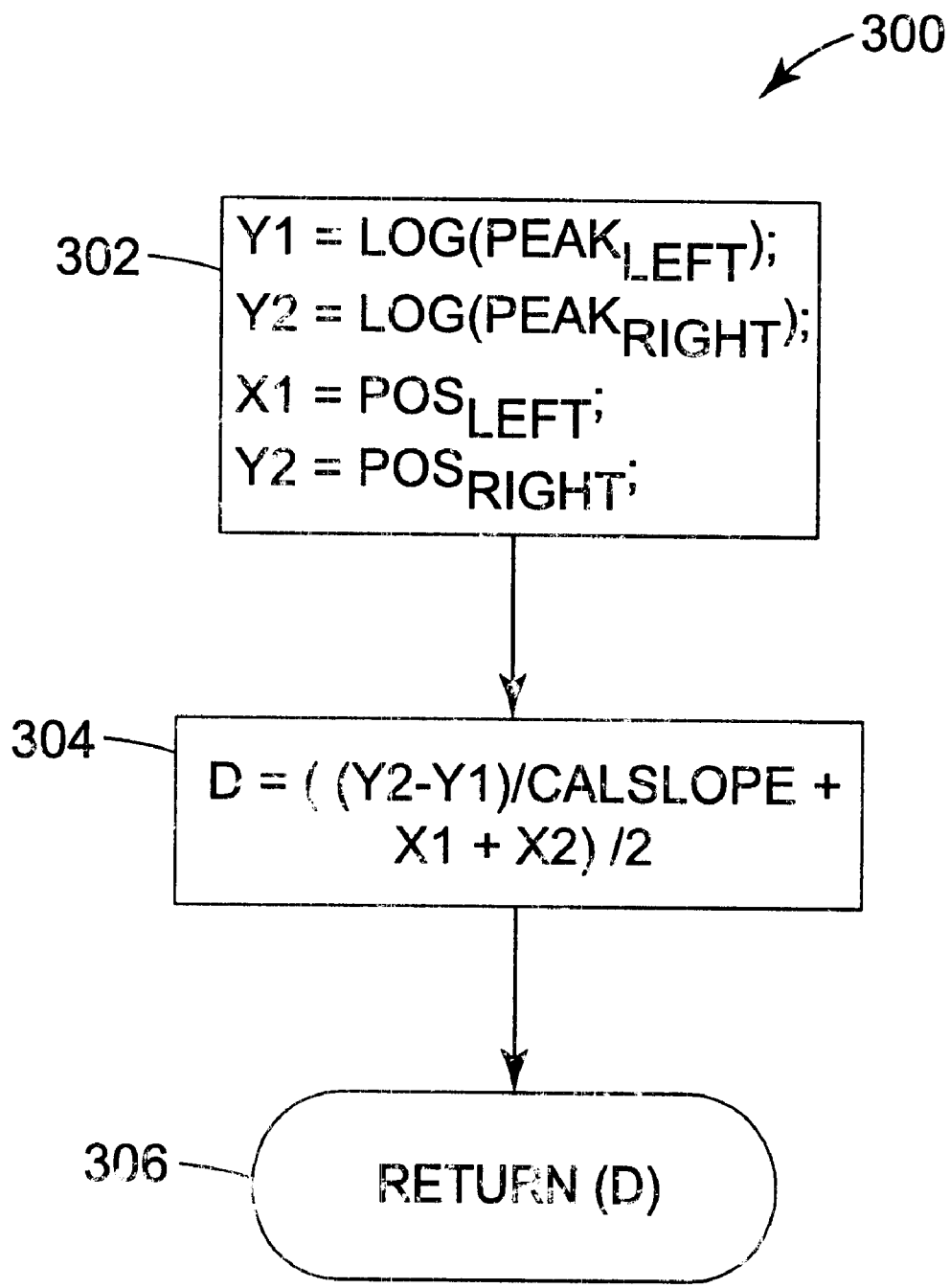
FIG. 6 is a flow diagram of an inside distance calculation algorithm performed by the processing module of the present invention.
Figure 7A:
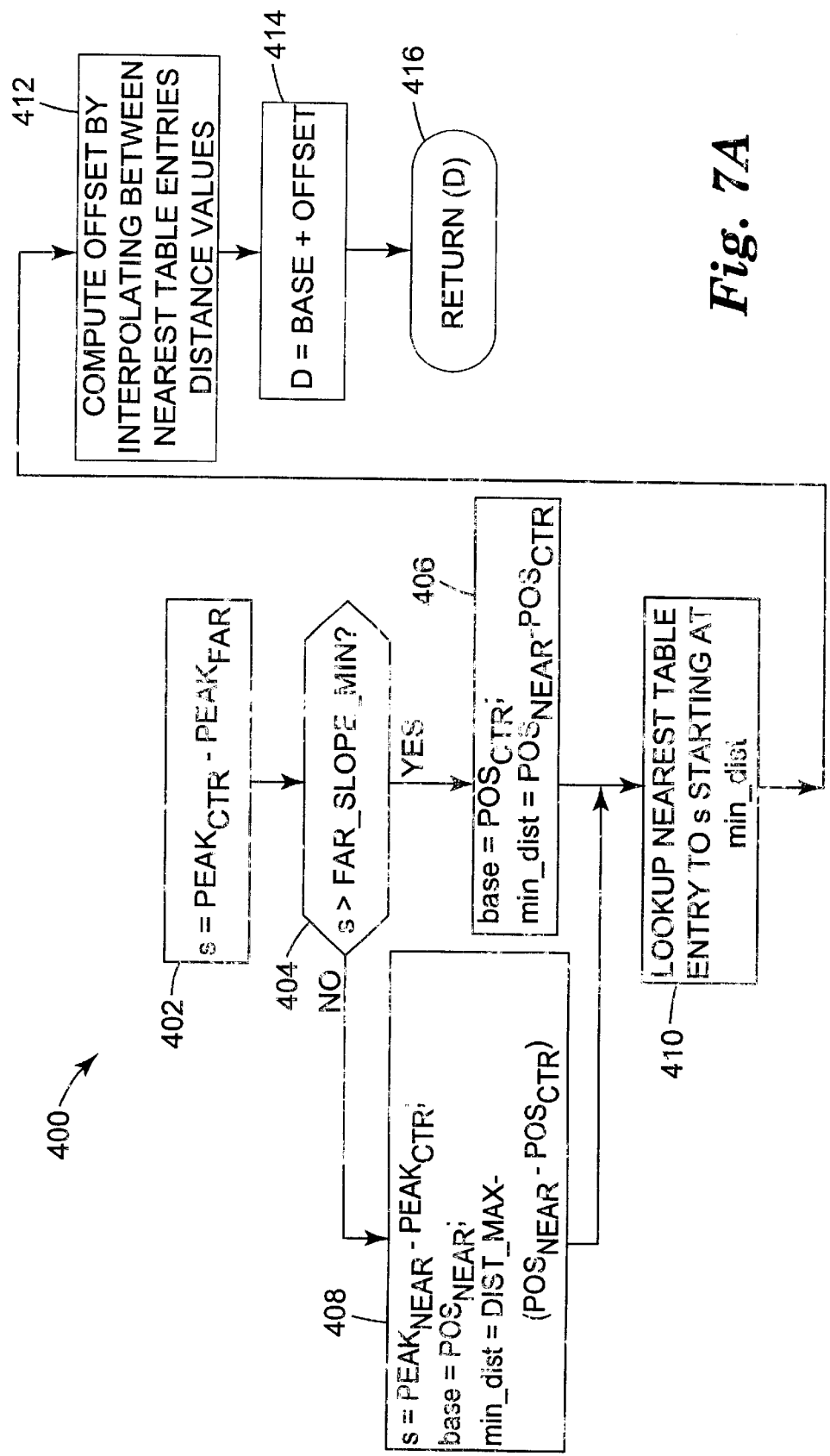
FIG. 7A is a flow diagram of an outside distance calculation algorithm performed by the processing module of the present invention.

Referring again to FIG. 5A, following the evaluation step 220, the ($POS_n$, $PEAK_n$) coordinates of the two magnetic field sensors positioned immediately on either side of the magnetic field source may be passed by the microprocessor to the inside distance algorithm 300 illustrated in FIG. 6 or to the outside distance algorithm 400 illustrated in FIG. 7A.

If the magnetic field source lies within the sensor span and the inside distance algorithm is used, in block 302 of FIG. 6 the LOG of the measured peak values is performed to linearize the peaks over distance. These coordinates, ($POS_n$, $LOG(PEAK_n)$) of the two sensors may be represented by two points on a two-dimensional graph as exemplified in FIG. 5B. Next, in block 304 the microprocessor extrapolates a line with a positive slope equal to the CALSLOPE through the point on the left of the magnetic field source. A line with a negative slope equal to the CALSLOPE is extrapolated through the point on the right of the magnetic field source. The intersection point of these two lines is found using the formula below and returned as the calculated distance in block 306:

$$D = \left( \frac{LOG(PEAK_{left}) - LOG(PEAK_{right})}{CALSLOPE} \right) + POS_{left} + POS_{right})/2$$

where left refers to the data from the sensor on the left of the magnetic field source and right refers to the data from the sensor on the right of the magnetic field source.

If the magnetic field source lies outside the sensor span and the outside distance algorithm is to be used, as shown in FIG. 7A the microprocessor performs a table lookup step in which an appropriate value is retrieved from a lookup table stored in memory. This lookup table can be created using an appropriate simulation model or actual test data. This table may be updated in real time if the magnetic field source lies within the span of the tape interface module using the distances calculated from the inside distance algorithm shown in FIG. 6.

The lookup table is height dependent, i.e. the values of $H_x$ in the table are calculated and/or measured with respect to the height (distance along the z-axis; see FIG. 1) of the sensors in the tape interface module above the magnetic field source. The appropriate table is selected based on the height information (HEIGHT) calculated above. Each entry in the lookup table is a (distance, peak difference) pair. The distance entries in the (distance, peak difference) pairs in the lookup table are set at appropriate intervals depending on the intended application. A typical interval for the distance entries in the lookup table is about 0.5 inch (1.25 cm). As illustrated in block 402 of FIG. 7A, the peak difference values in the (distance, peak difference) pairs in the lookup table are calculated from the difference between the relative peak values of the magnetic field measured by two neighboring sensors (the PEAK of the center sensor and the PEAK of at least one peripheral sensor) when the magnetic field source is a specific, known distance outside the span of the source interface module. The table values are valid only for a magnetic field source located outside (i.e. not between) the span of the sensors of the source interface module and the distance is measured relative to the sensor nearest the magnetic field source.

Tape manufacturing tolerances and environmental conditions such as temperature may cause variations in the intensity of the magnetic field. It is necessary that the system be capable of calibrating values in the outside distance algorithm to account for variations in magnetic field intensity. For example, at a very low temperature, the field intensity at each sensor may be about 10% higher than the same field intensity at nominal conditions. However, the lookup table values shown in Table 1 in Example 4 below, which were generated assuming nominal magnetic field intensity, indicate that at 11.0 inches (28 cm) away from the tape the difference in sensor values would be 4.53. Thus, the 4.53 value would need to be scaled by a factor of about 10% to 4.98 (4.53*1.1) before performing the lookup.

The system calculates the lookup table-scaling factor when the tape is inside the sensor span. First, the position of the object from the tape is computed using the inside distance algorithm. Next, the difference in peak values between the sensor pair not spanning the magnetic field source (center sensor and sensor farthest from the tape) is calculated. Then the calculated position is found in the lookup table. The corresponding table difference value and the true difference are compared to calculate a scale factor for the lookup table using the following equation:

table scaling factor=true difference/table difference

Figure 7B:
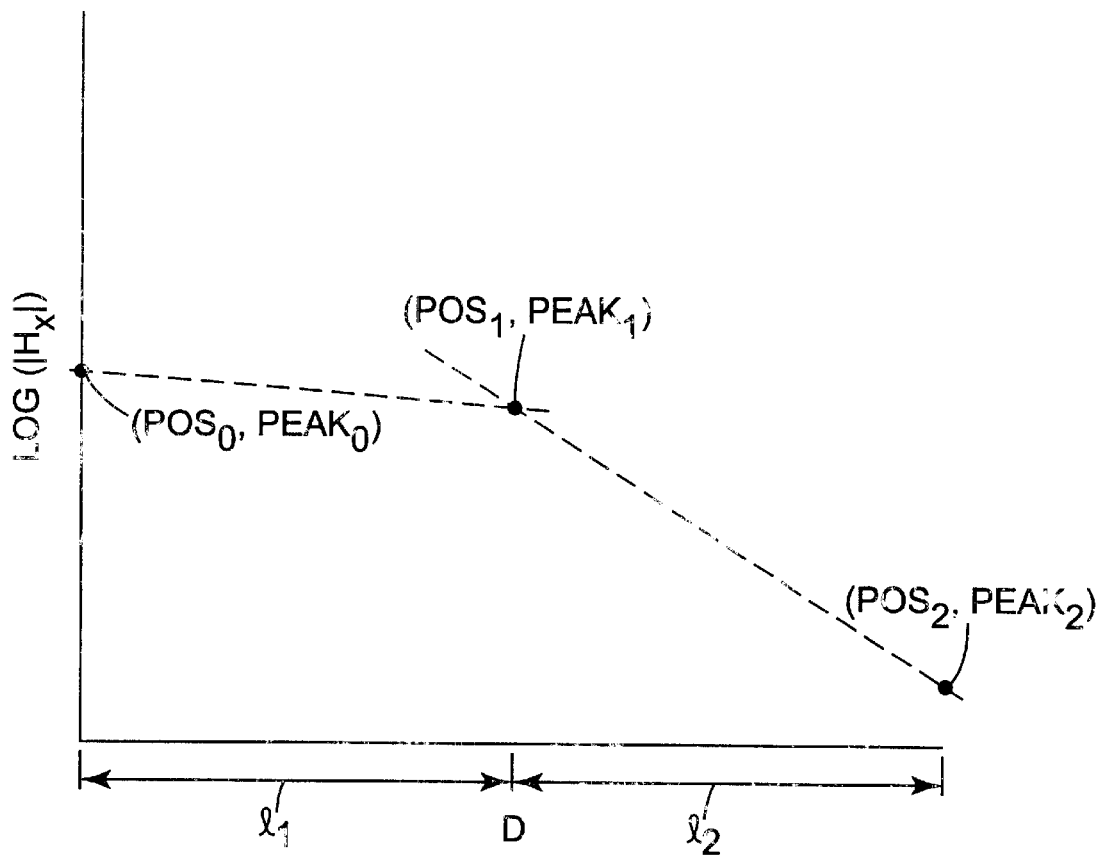
FIG. 7B is a two-dimensional plot of the data points utilized by the microprocessor in the outside distance algorithm.

As shown in block 404 of FIG. 7A, the microprocessor examines to a two-dimensional graph of $H_x$ vs. d. Referring to FIG. 7B, assuming the three magnetic field sensors 34

(Sensor 0), 36 (Sensor 2), 38 (Sensor 1) of the present embodiment, three points are present for analysis. The central magnetic field sensor and the peripheral sensor nearest the magnetic field source, in this case Sensor 0, will return the largest values of $H_x$. The peripheral magnetic field sensor farthest from the magnetic field source, in this case Sensor 2, will return a significantly smaller value of $H_x$.

According to the equations $$m_{01} = \frac{\mathrm{LOG}(PEAK_{S0}) - (\mathrm{LOG}(PEAK_{S1})}{POS_{S0} - POS_{S1}}$$

$$m_{12} = \frac{\mathrm{LOG}(PEAK_{S1}) - \mathrm{LOG}(PEAK_{S2})}{POS_{S1} - POS_{S2}}$$

the slope of the line $m_{01}$ between points ($POS_0$, $PEAK_0$) and ($POS_1$, $PEAK_1$) will be relatively flat, while the slope of the line $m_{02}$ between points ($POS_2$, $PEAK_2$) and ($POS_1$, $PEAK_1$) will be significantly more steep.

In blocks 404 and 406 of FIG. 7A, the microprocessor is programmed to first examine the line with slope $m_{12}$, which includes data obtained from the central sensor (Sensor 1 in FIG. 7B, represented by point ($POS_1$, $PEAK_1$)) and the peripheral sensor farthest from the magnetic field source (Sensor 2 in FIG. 7B, represented by point ($POS_2$, $PEAK_2$)). The slope $m_{12}$, which is based on the difference between $PEAK_1$, and $PEAK_2$, will vary considerably with the magnitude of d. The line with slope $m_{01}$, which contains data obtained from the central sensor (Sensor 1 in FIG. 7B, represented by point ($POS_1$, $PEAK_1$)) and the peripheral sensor closest to the magnetic field source (Sensor 0 in FIG. 7B, represented by point ($_{POS0}$, $PEAK_0$)) is based on the much smaller difference between $PEAK_1$ and $PEAK_0$. Therefore, the magnitude of $m_{01}$ will not vary significantly with d. In this procedure the microprocessor determines the optimal peak value difference (i.e. ($PEAK_1-PEAK_0$) or ($PEAK_1-PEAK_2$)) on which to base a distance calculation. This peak value difference typically represents the peak values of the furthest two sensors from the magnetic field source.

If the magnitude of the peak value difference between the two sensors farthest from the magnetic field source is greater than a minimum FARSLOPE criteria stored in memory, that peak value difference (($PEAK_1-PEAK_2$) in the present example) is used for the table lookup. The magnetic field source lies outside the span of the tape interface module, so the microprocessor begins to search in the lookup table at a distance equal to the distance between the closest two sensors to the magnetic field source. The magnetic field source must be at least this far away from the middle sensor.

However, as shown in block 408 in FIG. 7A, if the peak value difference between the two sensors farthest from the magnetic field source does not meet the minimum FARSLOPE criteria stored in memory, the peak value difference between the two sensors nearest to the tape (($PEAK_1-PEAK_0$) in this example) is used instead. The microprocessor now begins a search in the lookup table at a distance equal to the maximum distance in the lookup table minus the separation between the closest two sensors to the magnetic field source. The magnetic field source must be at least this far from the peripheral sensor since the magnetic field source is farther than the maximum distance in the lookup table from the center sensor.

After the closest slope entry in the lookup table is found in block 410, the distance D is computed in block 412 by interpolating between the nearest two table entries. The computed distance D is adjusted in block 414 according to the position of the sensor pair that was used in the lookup procedure, and is always reported relative to the center sensor. The final value for D is then returned in block 416.

After the microprocessor applies the distance algorithm and calculates a value for D, the processing module may transmit position information to other devices, such as, for example, an electronic display in the interior of a vehicle. The distance detection system of the present invention may be used in many aspects of vehicular control, such as, for example, automated steering, lane departure warning systems, vehicle docking, cruise control and braking. The system may be used in many different types of vehicles, such as, for example, automobiles, trucks, factory robots and fork lifts. The system may be used to log the performance of the driver of a vehicle.

EXAMPLES

The source interface module included three magnetic field sensors. The sensors were spaced 10 inches (25.4 cm) apart in the source interface modules with sensor 0 oil the left, sensor 1 in the middle, and sensor 2 on the right. The magnetic field source was a magnetic tape manufactured by Minnesota Mining and Manufacturing Company (3M), St. Paul, Minn., described in U.S. Pat. No. 5,853,846.

Example 1

In the first example, the middle sensor in the source interface module (Sensor 1) moved directly over the tape. The average peak values found were 6.71 Volts (V), 15.5V, and 6.85V for sensors 0, 1, and 2 respectively. A two dimensional plot of the LOG of the average peak value vs. sensor position in the tape interface module is shown in FIG. 8.

Figure 8:
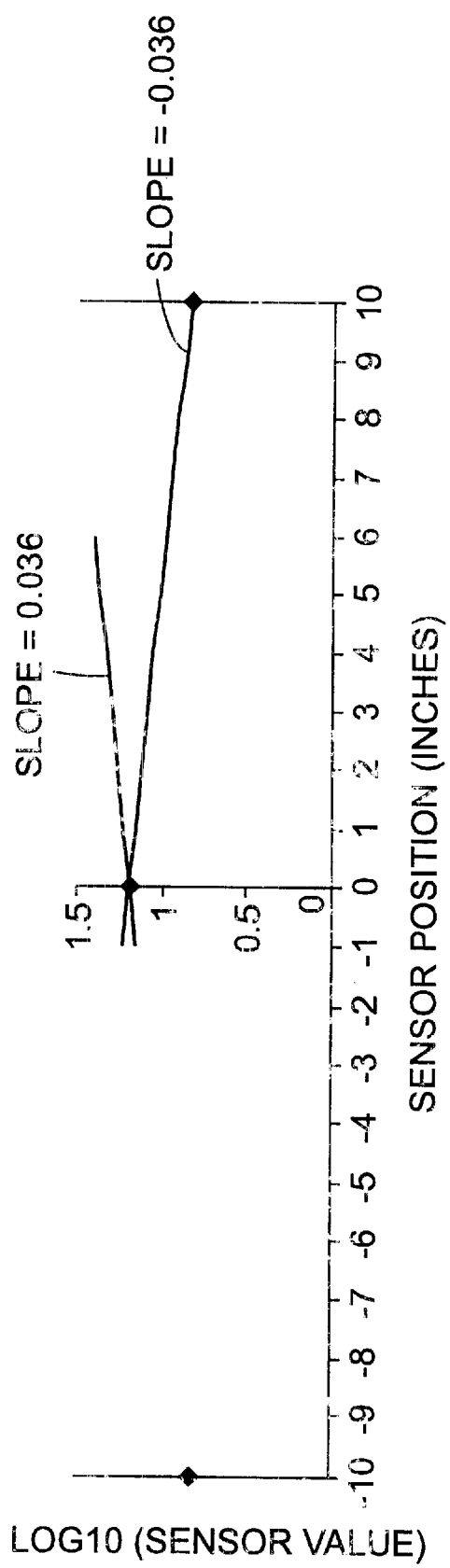
FIG. 8 is a two-dimensional plot of the data points utilized by the microprocessor in Example 1.

To analyze the data in FIG. 8 the microprocessor started at the beginning of the flow chart shown in FIG. 5A. Using the LOG of the average peaks and the 10 inch (25.4 cm) sensor separation, the slopes of the lines between the points are found: $m_{01}$=0.036 and $m_{12}$=−0.035. Since these slopes are opposite and nearly equal, the microprocessor recognized this as a calibration point and averaged the magnitudes of $m_{01}$ and $m_{02}$ to provide a CALSLOPE=0.036.

Since the peak from sensor 2 is larger than the peak from sensor 0, the NEARSLOPE=0.035 and the FARSLOPE= 0.036. The near slope is the wrong direction for the tape to be outside the span of the tape interface module. Therefore, the inside distance algorithm shown in FIG. 6 was applied by the microprocessor. The distance (D) was calculated as:

$$D = \left(\frac{\mathrm{LOG}(6.85) - \mathrm{LOG}(15.5)}{0.036}\right) + 0 + 10)/2 = 0.074 \text{ inches } (0.190 \text{ cm})$$

Example 2

Figure 9:
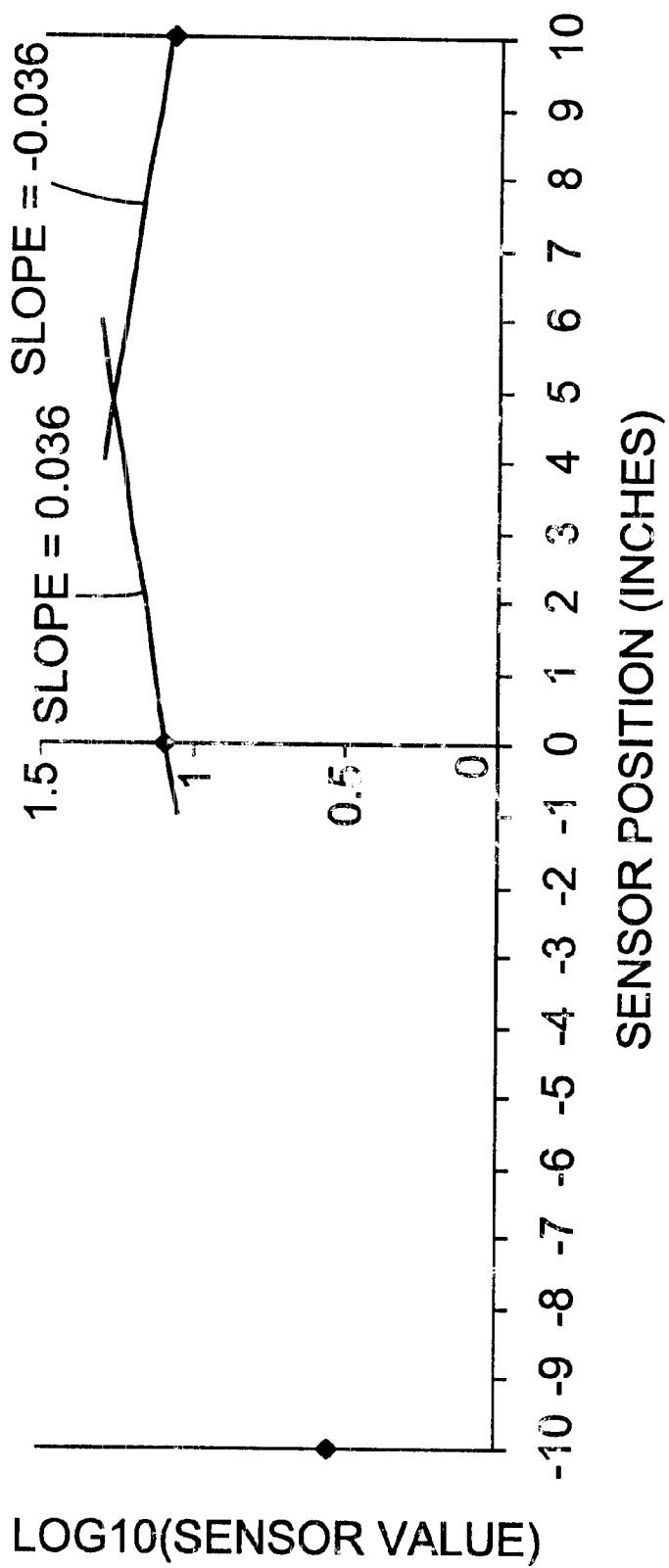
FIG. 9 is a two-dimensional plot of the data points utilized by the microprocessor in Example 2.

Next, assume the sensors have drifted towards the left such that the tape is centered between sensors 1 and 2 (see FIG. 9). The average peak values found are 3.48V, 12.4V, and 11.9V for sensors 0, 1, and 2 respectively.

The microprocessor starts at the beginning of the flow chart shown in FIG. 5A. Using the LOG of the average peaks and the 10 inch sensor separation, the slopes of the lines between the points are found: $m_{01}$=0.055 and $m_{12}$=− 0.018. Since peak from sensor 2 is larger than the peak for sensor 0, the NEARSLOPE=−0.018 and the FARSLOPE= 0.055. The NEARSLOPE is the wrong direction for the tape to be outside the sensor span, and the microprocessor applies the inside distance algorithm shown in FIG. 6. The distance (D) is calculated as:

$$D = \left(\frac{\text{LOG}(11.9) - \text{LOG}(12.4)}{0.036}\right) + 0 + 10)/2 = 4.75 \text{ inches } (12.0 \text{ cm})$$

Example 3

Figure 10:
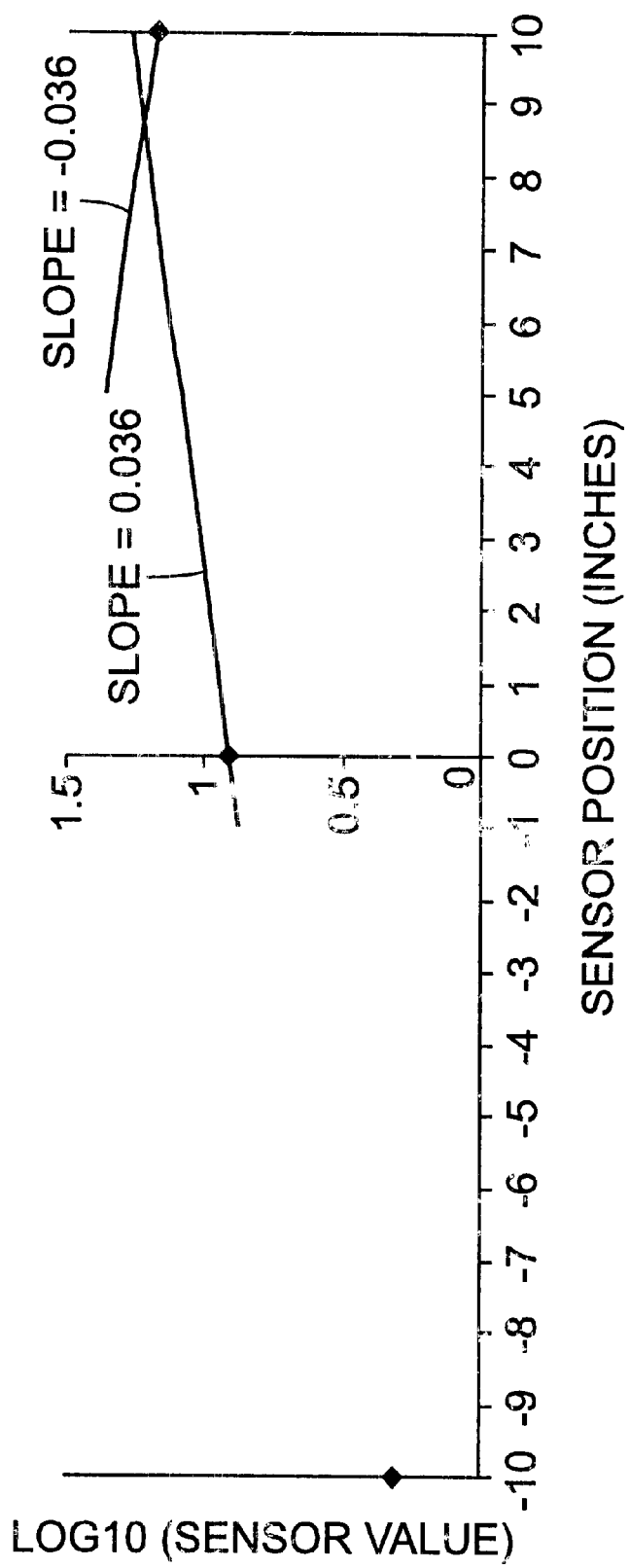
FIG. 10 is a two-dimensional plot of the data points utilized by the microprocessor in Example 3.

Assume the sensors keep drifting towards the left such that the tape is just inside (to left of) sensor 2 (see FIG.10). The average peak values found are 2.03V, 8.2V, and 15.2V for sensors 0, 1, and 2 respectively.

The microprocessor again starts at the beginning of the flow chart shown in FIG. 5A. Using the LOG of the average peaks and the 10 inch sensor separation, the slopes of the lines between the points are found: $m_{01}=0.061$ and $m_{12}=0.027$. Since the peak from sensor 2 is larger than the peak for sensor 0, the NEARSLOPE=0.027 and the FARSLOPE=0.061. The magnitude of the NEARSLOPE is still less than the CALSLOPE, so the microprocessor applied the inside distance algorithm shown in FIG. 6. The distance (D) is calculated as $$D = \left(\frac{\text{LOG}(15.2) - \text{LOG}(8.2)}{0.036}\right) + 0 + 10)/2 = 8.72 \text{ inches } (22.1 \text{ cm})$$

Example 4

Now assume the sensors have moved to the left of the tape such that the tape is outside (to right of) sensor 2. The average peak values found are 1.39V, 5.70V, and 15.2V for sensors 0, 1, and 2 respectively.

The microprocessor again starts at the beginning of the flow chart shown in FIG. 5A. Using the LOG of the average peaks and the 10 inch sensor separation, the slopes of the lines between the points are found: $m_{01}=0.061$ and $m_{12}=0.042$. Since the peak value from sensor 2 is larger than that of sensor 0, the NEARSLOPE=0.042 and the FARSLOPE=0.061. The magnitude of the NEARSLOPE exceeds the CALSLOPE, and the microprocessor applies the outside distance algorithm shown in FIG. 7A.

Using the outside distance algorithm, the microprocessor calculates the difference between the peak values of the furthest two sensors from the tape to be 5.7V−1.39V=4.31V. Assume the CALSLOPE (0.036) corresponds to a 12 inch (30.5 cm) HEIGHT with a minimum FARSLOPE=2.56.

Thus, the difference found meets the FARSLOPE criteria and base=0, min distance=10 inches (25.4 cm). The microprocessor searches the lookup table with entries after a distance of 10 inches (25.4 cm). The table for a 12 inch (30.5 cm) HEIGHT is shown in Table 1. The nearest entries found matching a difference of 4.31V are at 11.0 inches (27.9 cm) and 11.5 inches (29.2 cm). The distance of 11.3 inches (28.7 cm) is calculated by interpolating between the two table entries.

Example 5

Now assume the sensors have moved far to the left of the tape such that the tape is outside (to right of) sensor 2. The average peak values found are 0.62V, 2.43V, and 9.5V for sensors 0, 1, and 2 respectively.

The microprocessor again starts at the beginning of the flow chart shown in FIG. 5A. Using the LOG of the average peaks and the 10 inch sensor separation, the slopes of the lines between the points are found; $m_{01}=0.059$ and $m_{12}=0.059$. Since peak from sensor 2 is larger than sensor 0, the NEARSLOPE=0.059 and the FARSLOPE=0.059. The magnitude of the near slope has exceeded the CALSLOPE, thus the microprocessor applies the outside distance algorithm shown in FIG. 7A.

Using the outside distance algorithm, the microprocessor calculates the difference between the peak values of the furthest two sensors from the tape to be 2.43V−0.62V=1.81V. Assume the CALSLOPE (0.036) corresponds to a 12 inch (30.5 cm) HEIGHT with a minimum far slope=2.56. The difference of the far sensors does not meet the FARSLOPE criteria so the near sensors must be used.

The difference between the peak values of the near sensors is found to be 9.5V−2.43V=7.07V and base=10, min dist=15 inches (corresponds to a table difference entry of 2.56)−10 inches (sensor separation)=5 inches (12.7 cm). Thus, the microprocessor starts the table lookup with entries after a distance of 5 inches (12.7 cm). The table for a 12 inch (30.5 cm) HEIGHT is shown in TABLE 1 above. The nearest entries found matching a difference of 7.07V are at 7.0 inches (17.8 cm) and 7.5 inches (19.1 cm). The distance of 7.4 inches (18.80 cm) is calculated by interpolating between the two table entries. This distance must be adjusted by the sensor spacing since the near sensors are being used. Thus, the final distance result returned is 17.4 inches (44.2 cm).

Example 6

Figure 11:
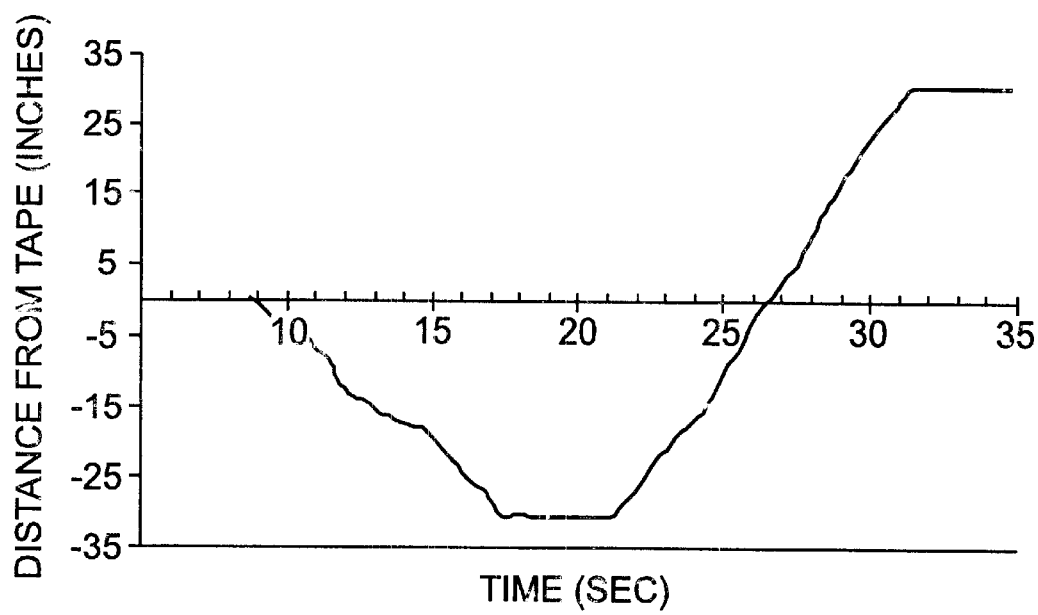
FIG. 11 is a two-dimensional plot of a location of a vehicle vs. time for Example 5.

Results of a test run are shown in FIG. 11. The sensors were mounted under a vehicle's front bumper with 10 inch (25.4 cm) spacing at a 12 inch (30.5 cm) HEIGHT from the road. The vehicle was moving at about 25 MPH on a roadway lined with a magnetic tape in the center of the driving lane. The vehicle started on the right edge of the road, crossed to the left side, and then returned to the right side. As shown in the figure, the system does not produce any distance information until the vehicle crosses over the tape and the system calibrates. A verification system was not available so the error is unknown. However, the system does appear to have an overall linear response with a detection range of about ±30 inches (±76 cm).

A number of embodiments of the present invention have been described.

Nevertheless, it will be understood that various modifications may be made without departing from the spirit and scope of the invention. Accordingly, other embodiments are within the scope of the following claims

TABLE 1

{0.0, 8.82}, {0.5, 9.23}, {1.0, 9.53}, {1.5, 9.73}, {2.0, 9.84}, {2.5, 9.85},
{3.0, 9.78}, {3.5, 9.64}, {4.0, 9.44}, {4.5, 9.19}, {5.0, 8.88}, {5.5, 8.56},
{6.0, 8.20}, {6.5, 7.82}, {7.0, 7.44}, {7.5, 7.04}, {8.0, 6.66}, {8.5, 6.27},
{9.0, 5.90}, {9.5, 5.53}, {10.0, 5.18}, {10.5, 4.84}, {11.0, 4.53}, {11.5, 4.22},
{12.0, 3.94}, {12.5, 3.67}, {13.0, 3.42}, {13.5, 3.18}, {14.0, 2.96}, {14.5, 2.75},
{15.0, 2.56}, {15.5, 2.38}, {16.0, 2.21}, {16.5, 2.06}, {17.0, 1.91}, {17.5, 1.78},
{18.0, 1.65}, {18.5, 1.54}, {19.0, 1.43}, {19.5, 1.33}, {20.0, 1.24}, {20.5, 1.16}

What is claimed is:

1. A detection system for determining the position of an object moving along a first direction, the system comprising:
   (a) a magnetic field source generating a magnetic field signal; and
   (b) a magnetic field detection system coupled to the object, the detection system comprising:
      (i) a source interface module comprising magnetic field sensors positioned a known distance apart along a second direction different from the first direction, wherein each sensor detects the magnetic field generated by the magnetic field source and generates a magnetic field signal,
      (ii) a processing module that processes the magnetic field signal produced by the source interface module, wherein the processing module:
         (1) determines magnetic field peak data from the magnetic field signal along the first direction for each sensor, and
         (2) determines the relative difference between the magnetic field peak data for adjacent sensors to determine the distance of the object from the magnetic field source along the second direction.

2. The detection system as claimed in claim 1, wherein the magnetic field source generates an oscillating magnetic field signal.

3. The detection system as claimed in claim 1, wherein the source interface module comprises at least two magnetic field sensors.

4. The detection system as claimed in claim 1, wherein the source interface module comprises at least three magnetic field sensors.

5. The detection system as claimed in claim 1, wherein the first direction and the second direction are normal to each other.

6. The system of claim 5, wherein the determination of distance in step (b)(ii)(2) based on the relative differences is independent of the distance of the source interface module from the magnetic field source along a third direction substantially normal to the first and second directions.

7. The detection system as claimed in claim 1, wherein the magnetic field source is a magnetic tape.

8. The system of claim 7, wherein the magnetic tape is positioned along the first direction.

9. The system of claim 1, wherein the processing module determines, based on the relative differences between the magnetic field peak data, whether the source lies inside or outside the span of the source interface module.

10. The system of claim 9, wherein the processing module further applies one of an inside distance algorithm and an outside distance algorithm.

11. The system of claim 1, wherein the source interface module comprises a central magnetic field sensor, at least one first magnetic field sensor on a first side of the central magnetic field sensor, and at least one second magnetic field sensor on a second side of the central magnetic field sensor opposite the first side.

12. The system of claim 11, wherein in step (b)(ii)(2) the processing module determines a first slope of a first line between a data point for the central magnetic field sensor and a data point for the first magnetic field sensor, and determines a second slope of a second line between the data point for the central magnetic field sensor and a data point for the second magnetic field sensor.

13. The detection system of claim 12, wherein if the first slope and the second slope are opposite and of approximately equal magnitude, the processing module
   determines a calibrated slope, and
   evaluates the first slope, the second slope, and the magnetic field peak data using the calibrated slope to determine the distance of the object from the magnetic field source along the second direction.

14. A method for determining the position of an object moving along a first direction, the method comprising:
   (a) generating a magnetic field signal in the first direction; and
   (b) sensing the magnetic field signal with an array of magnetic field sensors positioned a known distance apart along a second direction different from the first direction, wherein each sensor detects the magnetic field signal and generates a magnetic field peak signal corresponding to the relative intensity of the detected field along the first direction,
   (c) generating peak data from the magnetic field signal for each sensor in the processing module, and
   (d) determining the relative difference between the magnetic field peak data for adjacent sensors to determine the distance of the object from the magnetic field source along the second direction.

15. The method as claimed in claim 14, wherein the magnetic field signal is an oscillating magnetic field signal.

16. The method as claimed in claim 14, wherein the sensor array comprises at least two magnetic field sensors.

17. The method of claim 14, wherein the second direction is normal to the first direction, and wherein the determination of distance in step (d) based on the relative differences is independent of the distance of the source interface module from the magnetic field source along a third direction substantially normal to the first and second directions.

18. The method of claim 17, wherein the processing module further applies one of an inside distance algorithm and an outside distance algorithm.

19. The method of claim 18, wherein in step (b)(ii)(2) the processing module determines a first slope of a first line between a data point for the central magnetic field sensor and a data point for the first magnetic field sensor, and determines a second slope of a second line between the data point for the central magnetic field sensor and a data point for the second magnetic field sensor.

20. The detection system as claimed in claim 19 wherein if the first slope and the second slope are opposite and of approximately equal magnitude, the processing module
   determines a calibrated slope, and
   evaluates the first slope, the second slope, and the magnetic field peak data using the calibrated slope to determine the distance of the object from the magnetic field source along the second direction.

21. The method as claimed in claim 14, wherein the source interface module comprises three magnetic field sensors.

22. The method as claimed in claim 21, wherein the sensors are aligned along the second direction.

23. The method of claim 14, wherein the processing module determines in step (d), based on the relative differences, whether the source lies inside or outside the span of the source interface module.

24. The method of claim 14, wherein the source interface module comprises a central magnetic field sensor, at least one first magnetic field sensor on a first side of the central magnetic field sensor, and at least one second magnetic field sensor on a second side of the central magnetic field sensor opposite the first side.

25. The method of claim 14, wherein the magnetic field source is a magnetic tape positioned along the first direction.

26. A detection system for determining the position of an object moving along a first direction using a magnetic field source generating a magnetic field signal, the system comprising:
   (a) a magnetic field detection system coupled to the object, the detection system comprising:

(i) a source interface module comprising magnetic field sensors positioned a known distance apart along a second direction normal to the first direction, wherein each sensor detects the magnetic field generated by the magnetic field source and generates a magnetic field signal, (ii) a processing module that processes the magnetic field signal produced by the source interface module, wherein the processing module:

(1) determines magnetic field peak data from the magnetic field signal along the first direction for each sensor, and (2) determines the relative difference between the magnetic field peak data for adjacent sensors to determine the distance of the object from the magnetic field source along the second direction.

* * * * *

UNITED STATES PATENT AND TRADEMARK OFFICE
CERTIFICATE OF CORRECTION

PATENT NO. : 6,437,561 B1
DATED : August 20, 2002
INVENTOR(S) : Bartingale, Steven R.

It is certified that error appears in the above-identified patent and that said Letters Patent is hereby corrected as shown below:

Title page, Item [54] and Column 1, line 3,
Title, delete "SOURCES" and insert in place thereof -- SOURCE --.

Title page,
Item [73], Assignee, delete "Paul.," and insert in place thereof -- Paul, --.
Item [56], References Cited, U.S. PATENT DOCUMENTS, delete "Grambling" and insert in place thereof -- Gramling --.

Column 1,
Line 7, delete "1." preceding "Field".
Line 15, delete "2." preceding "Description".
Line 63, delete "." preceding "field".

Column 3,
Line 42, delete "a" following "of".

Column 4,
Line 23, insert -- a -- following "in".

Column 5,
Line 29, delete "$H_y$" and insert in place thereof -- $H_x$ --.

Column 6,
Line 9, delete " 20)" following "that".
Line 26, delete "$I_1,I_2$" and insert in place thereof -- $I_1, I_2$ --.
Line 39, delete "($H_x,H_y, H_z$)" and insert in place thereof -- ($H_x, H_y, H_z$) --.
Line 43, delete "($H_x$ )" and insert in place thereof -- ($H_x$) --.

Column 7,
Line 26, delete "micro controller" and insert in place thereof -- microcontroller --.

Column 8,
Line 67, delete "(Hx)" and insert in place thereof -- ($H_x$) --.

Column 9,
Line 26, delete "(Hx)" and insert in place thereof -- ($H_x$) --.
Lines 32 and 36, delete "determined" and insert in place thereof -- determine --.

UNITED STATES PATENT AND TRADEMARK OFFICE
CERTIFICATE OF CORRECTION

PATENT NO. : 6,437,561 B1
DATED : August 20, 2002
INVENTOR(S) : Bartingale, Steven R.

It is certified that error appears in the above-identified patent and that said Letters Patent is hereby corrected as shown below:

Column 11,
Line 17, delete "$M_{02}$" and insert in place thereof -- $M_{12}$ --.

Column 12,
Line 16, delete "oil" and insert in place thereof -- on --.
Line 41, delete "NEARSLOPE=0.035" and insert in place thereof
-- NEARSLOPE=-0.035 --.

Column 13,
Line 20, delete "as" and insert in place thereof -- as: --.

Column 14,
Line 55, delete "claims" and insert in place thereof -- claims. --.

Signed and Sealed this

Twenty-sixth Day of August, 2003

JAMES E. ROGAN
*Director of the United States Patent and Trademark Office*